(12) United States Patent
Kotvis (10) Patent No.: US 12,061,927 B2
(45) Date of Patent: Aug. 13, 2024

(54) IoT EDGE SCHEDULER MODULE AND SYSTEM

(71) Applicant: Insight Direct USA, Inc., Chandler, AZ (US)

(72) Inventor: Ben Kotvis, Sussex, WI (US)

(73) Assignee: Insight Direct USA, In c., Chandler, AZ (US)

( * ) Notice: Subject to any disclaimer, the term of this patent is extended or adjusted under 35 U.S.C. 154(b) by 0 days.

(21) Appl. No.: 18/134,948

(22) Filed: Apr. 14, 2023

(65) Prior Publication Data

US 2023/0259393 A1    Aug. 17, 2023

Related U.S. Application Data

(63) Continuation of application No. 17/564,498, filed on Dec. 29, 2021.

(51) Int. Cl.
*G06F 9/46* (2006.01)
*G06F 9/48* (2006.01)

(52) U.S. Cl.
CPC .................. *G06F 9/4881* (2013.01)

(58) Field of Classification Search
CPC ................................... G06F 9/4881
See application file for complete search history.

(56) References Cited

U.S. PATENT DOCUMENTS

| 9,152,467 | B2 | 10/2015 | Cadambi et al. |
| 9,974,048 | B2 | 5/2018 | Yang et al. |
| 10,833,940 | B2 | 11/2020 | Cencini et al. |
| 10,878,379 | B2 | 12/2020 | Wing et al. |

FOREIGN PATENT DOCUMENTS

WO    2020172852 A1    9/2020

*Primary Examiner* — Gregory A Kessler
(74) *Attorney, Agent, or Firm* — Kinney & Lange, P.A.

(57) ABSTRACT

An Internet of Things system comprises an IoT hub and a local subsystem with a plurality of subsystem devices. These subsystem devices include an edge hub communicatively coupled to the IoT hub and to each other subsystem device; a requestor module configured to perform a task according to a requestor module schedule; and a scheduler module with a persistent time loop. The scheduler module receives a scheduler request from the requestor module via the edge hub, and based on this scheduler request generates a subsystem schedule that includes the requestor module schedule. The scheduler module transmits at least a part of this subsystem schedule to a persistence layer outside of the local IoT subsystem, via the IoT hub. The scheduler module flags scheduled event occurrences via the time loop and the subsystem schedule, and transmits task-specific triggered messages to the requestor module in response to these event occurrences.

19 Claims, 7 Drawing Sheets

IoT EDGE SCHEDULER MODULE AND SYSTEM

CROSS-REFERENCE TO RELATED APPLICATION(S)

This application is a continuation U.S. application Ser. No. 17/564,498, filed Dec. 29, 2021, and entitled "IOT EDGE SCHEDULER MODULE AND SYSTEM," the disclosure of which is hereby incorporated by reference in its entirety.

BACKGROUND

The present invention relates generally to Internet of Things (IoT) systems, and more particularly to a scheduling module for IoT edge systems.

Internet of Things (IoT) systems include multiple interconnected modules. These can be arranged as external devices centrally connected via at least one IoT hub. IoT systems are increasingly used in a wide variety of applications ranging from industrial process monitoring and control to "smart home" residential systems.

Edge computing approaches to IoT systems additionally centralize local collections (subsystems) of IoT modules around edge hubs that serve as a local nexus for distributed computation and information storage closer to those subsystem modules, and as a gateway to cloud-based (i.e. remote) services provided through the IoT hub. Such local subsystems can operate independently or semi-independently from their parent IoT hub, when isolated.

In many applications, IoT edge systems can simultaneously provide many of the benefits of cloud-based computing solutions while retaining the capacity for independent local operation and reducing inter-network bandwidth requirements. By contrast, substantially fully cloud-based IoT systems use local devices that perform minimal local processing, and offload more complex processing tasks and tasks involving data aggregated from multiple devices to a nonlocal cloud service. Such approaches can become burdensome as the volume of data involved increases. IoT edge systems instead preferentially perform most routine processing tasks within the local subsystem, with an edge hub coordinating communications between local devices and handling many processing tasks, including processing of data aggregated from multiple devices within the local subsystem. The edge hub can communicate with cloud systems for remote subsystem access, remote and/or distributed data persistence, high level (i.e. multi-subsystem) control and analytics, and other purposes.

Many conventional IoT devices perform regularly scheduled tasks. In industrial contexts, for example, an IoT system or subsystem might include a plurality of sensors and actuators that regularly report states or perform actions, respectively. Such schedules can be regularly recurring (e.g. specifying a sensor sampling or reporting rate) or irregular (e.g. with a particular action scheduled in response to other events).

SUMMARY

In one aspect, the present disclosure is directed toward an IoT system with an IoT hub and a local subsystem. The local subsystem has a plurality of subsystem devices including an edge hub communicatively coupled to the IoT hub and to each other subsystem device; a requestor module configured to perform a task according to a requestor module schedule; and a scheduler module with a persistent time loop. The scheduler module receives a scheduler request from the requestor module via the edge hub, and based on this scheduler request generates a subsystem schedule that includes the requestor module schedule. The scheduler module transmits at least a part of this subsystem schedule to a persistence layer outside of the local IoT subsystem, via the IoT hub. The scheduler module flags scheduled event occurrences via the time loop and the subsystem schedule, and transmits task-specific triggered messages to the requestor module in response to these event occurrences.

In another aspect, the present disclosure is directed toward a scheduler module for an IoT edge system. This scheduler module includes an EventService submodule, a MessageScheduler submodule, and a SchedulerService submodule. The EventService submodule listens for scheduler requests from leaf modules within the IoT edge system. The SchedulerService submodule transmit updates regarding a state of the scheduler module to a persistence layer outside of the IoT edge system. The MessageScheduler submodule runs a persistent time loop and updates a master schedule based on scheduler requests received via the EventService submodule. In addition, the MessageScheduler submodule flags scheduled events as they occur, based on the master schedule and the state of the persistent time loop, and transmits triggered messages to the leaf modules based on the flagging of these scheduled events.

In yet another aspect, the present disclosure is directed toward a method of managing scheduling across distributed IoT devices within an IoT network that includes an IoT hub, an edge hub in communication with the IoT hub, and a plurality of leaf modules in communication with the edge hub. The leaf modules include a scheduling module and a plurality of requestor modules. According to this method, each requestor module transmits a scheduler request to the scheduler module via the edge hub. A master schedule housed on the scheduler module is updated based on the scheduler requests from all of the requestor modules. The scheduler module runs a persistent time loop, and flags scheduled events as they occur, based a state of the persistent time loop and the master schedule. Triggered messages are transmitted from the scheduler module to respective ones of the requestor modules in response to the flagged, scheduled event. Persistence data including at least a portion of the master schedule is transmitted from the scheduler module to the IoT hub.

The present summary is provided only by way of example, and not limitation. Other aspects of the present disclosure will be appreciated in view of the entirety of the present disclosure, including the entire text, claims, and accompanying figures.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

Internet of Things (IoT) leaf modules commonly carry out tasks according to schedules included in each respective module. By relocating scheduling to a dedicated scheduler module within the edge subsystem, the overall computational load across subsystem modules is decreased and schedule persistence is simplified, while still enabling subsystem activities to proceed as scheduled without accessing the IoT hub. This approach permits independent or semi-independent operation by the edge subsystem, while providing cloud-based data persistence for module schedules through the IoT hub.

A variety of services directed to IoT edge systems are commercially available. The present disclosure focuses for illustrative purposes on an approach using Microsoft Azure IoT Edge, but will be understood by a person skilled the art to be adaptable to other IoT edge environments. Different environments can vary in their specific protocols and data architectures, but the approach described herein is generally applicable to any IoT edge system.

Figure 1:
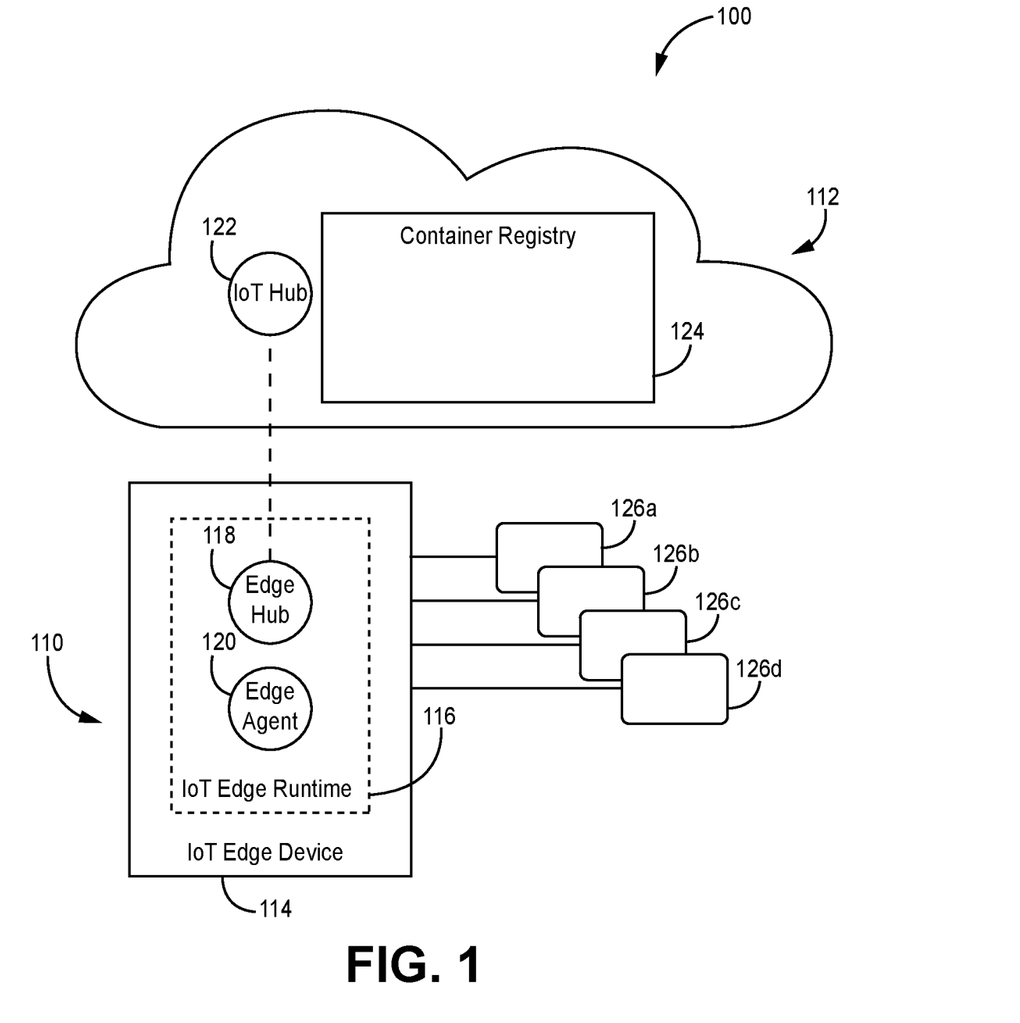
FIG. 1 is a block diagram providing a schematic overview of an IoT system.

FIG. 1 is a block diagram of IoT system 100, which includes both edge system 110 and cloud 112. IoT system 100 is a system of networked components, at least some of which are logic-capable devices, that together form a single Internet of Things grouping. IoT system 100 can include multiple semi-independent subsystems; the present specification lays out one such example subsystem focused around edge system 110. Edge system 110 is a subsystem of IoT system 100, situated on a local network. Edge system 110 is capable of offloading tasks including file backup/redundancy, control, and analytics to cloud services hosted by cloud 112, and may be in communication with other subsystems (not shown), but is also capable of operating independently of cloud 112 for sustained periods, e.g. when disconnected from cloud 112. More generally, edge system 110 is capable of performing most required processing tasks locally, even while connected to and capable of communication with other components of IoT system 100. IoT system 100 can, in an illustrative embodiment, be the Microsoft Azure IoT Edge system. In some embodiments, IoT system 100 can include other IoT subsystems, including other IoT edge subsystems.

Edge system 110 is a local network system configured to communicate with and offload some functions to cloud 112, while remaining capable of mid-to-long term operation independent from cloud 112. In general, edge system 112 can be any such semi-independent computing system, and can include one or multiple distinct data processors, data storage devices, and interconnecting data buses, as well as peripheral components such as actuators, sensors, and other transducers in communication with that/those data processors. In some illustrative embodiments, for example, edge system 112 can be a local commercial or industrial network, a smart home, or other such geographically localized IoT subsystem. In the most general case, components of edge system 112 can be communicatively coupled directly or indirectly, via wired or wireless connections, across various network architectures. For the purpose of the present disclosure, edge system 112 will be described primarily as including an IoT edge device 114 configured to support an IoT edge runtime engine 116 that maintains an edge hub 118 and an edge agent 120. IoT edge device 114 is a gateway hardware device (or virtual machine) that communicates with IoT hub 112 (and thereby container registry 124) within cloud 112. In addition, IoT edge device 114 communicates with leaf modules 126a-d (hereinafter referred to collectively as leaf modules 126), which are submodules of edge system 110.

IoT edge device 114 is a logic capable hardware device including both data storage and control circuitry configured to implement functionality and/or process instructions. Although edge device 114 is illustrated as separate from but connected to leaf modules 126, any subset of leaf modules 126 can, in some embodiments, be distinct functional modules instantiated within shared hardware, e.g. on edge device 114 or on other hardware shared in common. Any or all of leaf modules 126 can correspond to external leaf devices, which can be logic-capable devices that include internal data storage. In the most general case, however, leaf modules 126 can be any logic level modules communicatively coupled with edge hub 118, and coupled to other leaf modules 126 only or primarily through edge hub 118. Although leaf modules 126 can in many embodiments correspond to external devices, leaf modules 126 need not operate on separate dedicated hardware.

As referred to throughout this disclosure, the term "processing circuitry" can include one or more of a processor, a microprocessor, a controller, a digital signal processor (DSP), an application specific integrated circuit (ASIC), a field-programmable gate array (FPGA), or other equivalent discrete or integrated logic circuitry. Most generally, "processing circuitry" refers to any hardware capable of executing or implementing firmware or software processes. In some embodiments of components, including in all embodiments of IoT edge device 114, "processing circuitry" includes hardware capable of executing changeable software instructions.

As referred to throughout this disclosure, the term "data storage" refers to any machine-readable storage media, which can include either or both volatile and/or non-transitory media. The term "non-transitory" can indicate that the storage medium is not embodied in a carrier wave or a propagated signal. In certain examples, a non-transitory storage medium can store data that can, over time, change (e.g., in RAM or cache). In some examples, data storage can be entirely or partly temporary memory, meaning that the primary purpose of data storage is not long-term storage. "Data storage" can also include volatile memory that does not maintain stored contents when power to devices (e.g., IoT edge device 114) are turned off. Examples of volatile memories can include random access memories (RAM), dynamic random-access memories (DRAM), static random-access memories (SRAM), and other forms of volatile memories. In some examples, data storage can also include one or more machine-readable storage media, including long-term non-volatile storage media as noted hereinafter. Non-volatile storage media can include but are not limited to magnetic hard discs, optical discs, flash memories and other forms of solid-state memory, or forms of electrically programmable memories (EPROM) or electrically erasable and programmable (EEPROM) memories. Most generally, the term "data storage" refers to any machine-readable data storage capable of retrievably housing stored data. In the principal embodiments described hereinafter, IoT edge device 114 includes at least some non-volatile data storage hardware, although further data storage, particularly for long-term persistence, is offloaded to other devices as described in greater detail below with respect to FIGS. 3 and 4 and elsewhere.

As noted above and illustrated in FIG. 1, IoT edge device 114 is communicatively coupled to IoT hub 122 in cloud 112, and thereby to container registry 124. Persistent data storage of IoT edge device 114 is loaded with a runtime environment including IoT edge runtime engine 116, and processing circuitry of edge device 114 is configured or selected to support IoT edge runtime engine 116. IoT edge runtime engine 116 is described herein as a software runtime engine including at least two functional modules: edge hub 118, and edge agent 120. More generically, however, module definitions within IoT edge runtime engine 116 can be drawn in any way and according to any communication protocol and network architecture capable of serving as a communication and processing nexus between cloud 112 and leaf modules 126, and capable of facilitating communications between and data aggregation from among leaf modules 126.

Edge hub 118 is a functional module of IoT edge runtime engine 116 responsible for facilitating both cloud communication between IoT hub 122 and modules of edge system 110, and local communication between local modules of edge system 110. Edge hub 118 acts as the central communication hub connecting multiple leaf modules 126 with each other and with cloud 112. Edge hub 118 can, in some embodiments, be the sole routing hub for all communications between leaf modules 126 (which may or may not themselves correspond to distributed hardware physically incorporated into individual dedicated devices, as noted above). Edge hub 118 acts as a local proxy for IoT edge hub 122, providing a single connection for AMQP, MQTT, and/or HTTP communications between IoT hub 122 and other modules of edge system 110. IoT edge device 114 can provide a centralized processor for computing tasks within edge system 110 via edge hub 118, referred to for simplicity hereinafter as processing by the edge hub (although other modules may be involved).

IoT edge agent 120 is a functional module of IoT edge runtime engine 116 responsible for deployment and maintenance of other modules within edge system 110. These modules can correspond to distinct devices within edge system 110, or can be functional modules not corresponding to specific separate hardware. Each leaf modules 126 can, for example, be a packetized module deployed and maintained by IoT edge agent 120. On startup of IoT edge runtime engine 116, IoT edge agent 120 instantiates modules within edge system 110 according to a deployment manifest (e.g., a JSON file). In most embodiments, IoT edge agent 120 deploys modules by retrieving module twins from IoT hub 122. IoT edge agent 120 also receives and reports errors and deployment states of modules within edge system 110. In some embodiments, IoT edge agent 120 may also be capable of deploying modules based on persistence layers provided locally (i.e., within edge system 110).

As noted above, IoT hub 122 is a non-local hub for cloud communication and cloud-based processing tasks used by edge system 110, and potentially by other IoT subsystems (not shown). At a minimum, IoT hub 122 is responsible for all communications between edge hub 118 and cloud-based modules or devices, including all cloud communications originating or terminating at leaf modules 126. In some instances, IoT hub 122 can also serve as a processing location (or as a proxy for offloaded processing handled in hardware by other cloud devices), and as the direct or indirect source of data storage, including storage of twinned modules as a persistence layer used by edge agent 120 to initialize modules of edge system 110, and/or to provide redundancy to persistence provided locally within edge system 110, and/or to diagnostic analysis or remote monitoring within cloud 112. Although only one IoT hub 122 and one edge hub 118 are shown, IoT hub 122 can serve as a communication nexus for multiple edge systems 112 via respective edge hub 118, and in some instances each edge hub 118 can be configured to communicate with and through multiple distinct IoT hubs, for example for redundancy/backup or to access separate cloud networks.

IoT hub 122 provides edge hub 118 and edge agent 120 with access to container registry 124, a managed repository of persistence data. In many embodiments, this persistence data can take the form of container images corresponding to images serviced by edge agent 120. In such embodiments, modules are persisted as containers including bundled software packages with application code, configuration files and libraries, and any other dependencies required for the module to run. For embodiments of the presently disclosed system using Microsoft Azure IoT Edge, container registry 124 serves as a primary repository of package images for modules of edge system 110, and stores persistence information including scheduling information, as described in greater detail below. Although container registry 124 is described herein primarily as a repository of images of containerized modules, container registry 124 can more generally be a stand-in for any storage medium for persistence layer data retrievable by edge device 114 through IoT hub 122 to deploy and/or maintain modules of edge system 110.

Leaf modules 126 can be modules corresponding to any IoT function or device capable of interfacing with edge hub 118. Some examples of leaf modules can include modules for sensors, transducers, or other transceivers, user/operator interfaces, system output devices, and semi-independent devices. More generally, a leaf module 126 can be provided for each hardware device or functional component with a corresponding logic layer module capable of operating within edge network 110, and in many cases in communication with other modules 126 at least partially via edge hub 118. Leaf modules 126 are mirrored for persistence through edge agent 120, as described hereinafter. Other than participating in the same edge system 110, leaf modules 126 need not be related.

Figure 2:
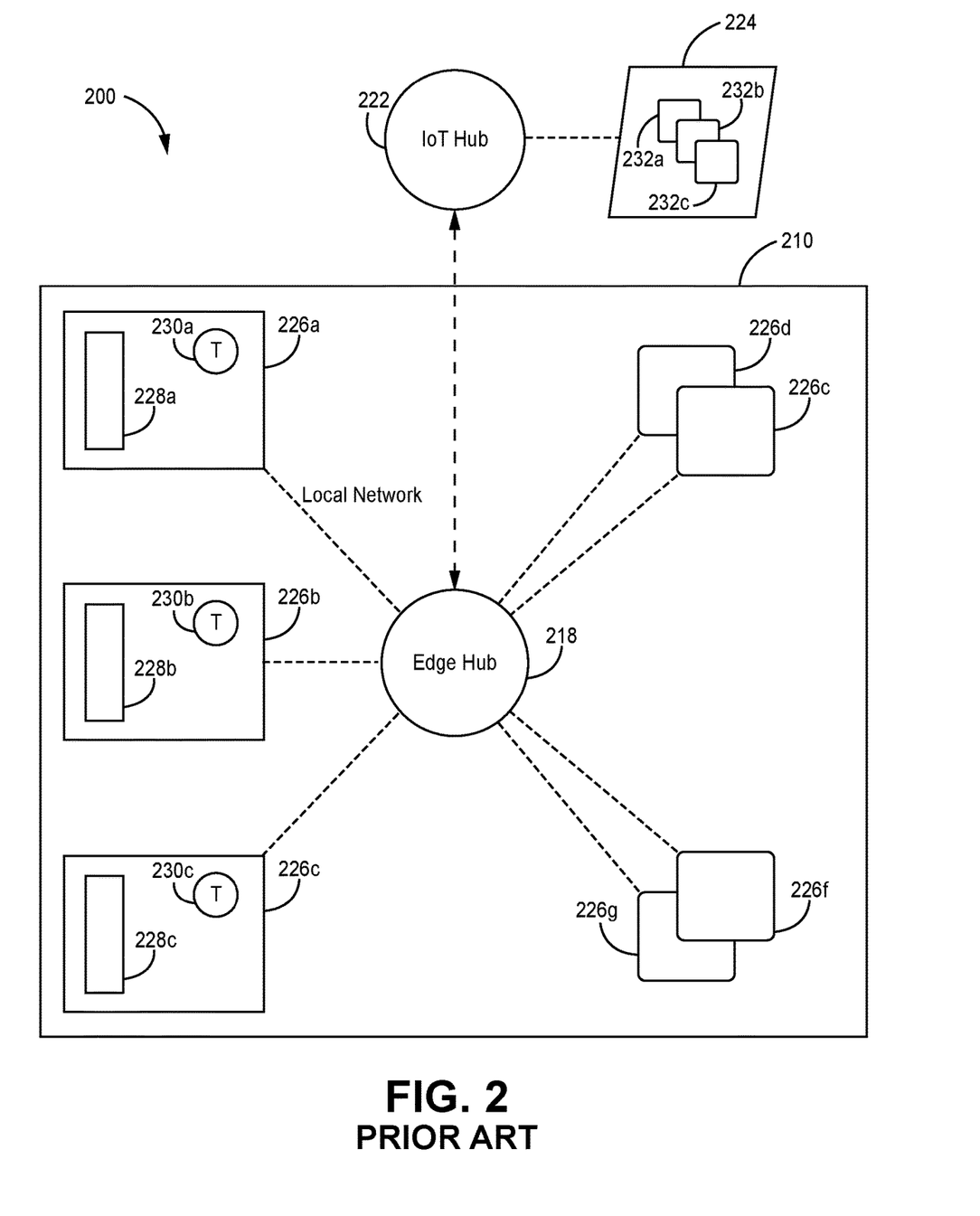
FIG. 2 is a block diagram illustrating a conventional local IoT network within the IoT system of FIG. 1, with an edge hub connecting multiple leaf modules using internal scheduling.

FIG. 2 is a block diagram illustrating a conventional local IoT system 200 operable generally as described with respect to FIG. 1, and having multiple leaf modules with separate internal schedule management. IoT system 100 of FIG. 1 provides a context for comparison of IoT system 200 against the alternative IoT systems discussed in greater detail hereinafter. For all successive figures, components with substantially similar functional roles are identified by corresponding numbers, e.g. 110 in FIG. 1 corresponding to 210 in FIG. 2, 310 in FIG. 3, etc. Where not otherwise specified, such corresponding components should be understood to operate generally analogously, with such differences in function and implementation as required or implied by specified differences between the embodiments shown and described with respect to each figure.

IoT system 200 includes edge system 210 with edge hub 218 acting as the common locus of local communication between a plurality of leaf modules 226a-g (hereinafter "leaf modules 226"). Edge hub 218 also acts as a common locus for all cloud communications between edge system 210 and IoT hub 222, including all retrieval or storage of persistence data to or from container registry 224. In the illustrated embodiment of FIG. 2, leaf modules 226 include three modules 226a, 226b, and 226c that perform tasks according to schedules. Other leaf modules 226d-g are not shown as including schedules. In the most general case, edge system 210 can include both leaf modules 226 that perform scheduled actions, and leaf modules 226 that do not perform scheduled actions, of which the former are of primary significance to the present disclosure.

Figure 3:
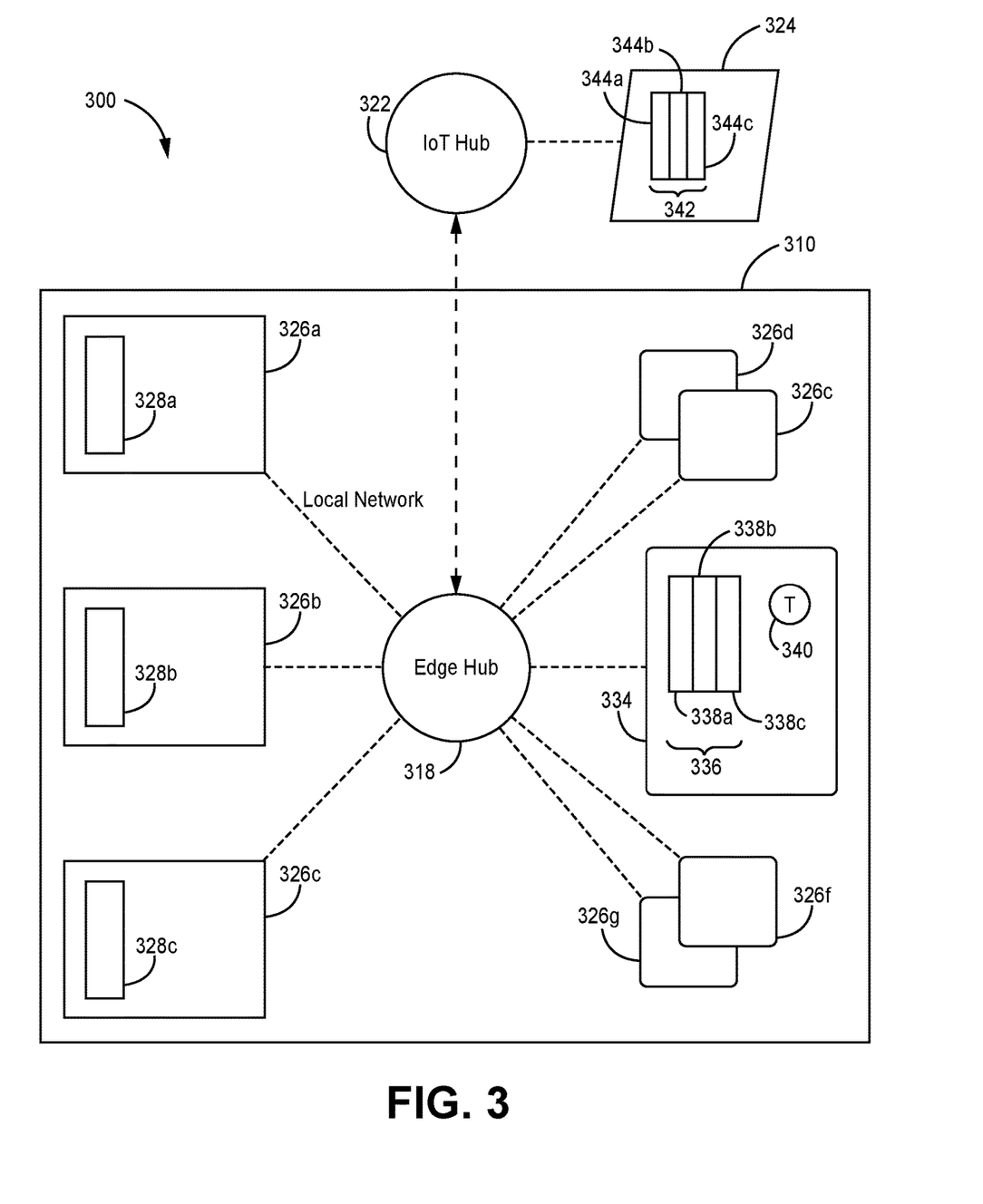
FIG. 3 is a block diagram illustrating a local IoT network within the IoT system of FIG. 1, with an edge hub connecting multiple leaf modules including a dedicated scheduler module.
Figure 4:
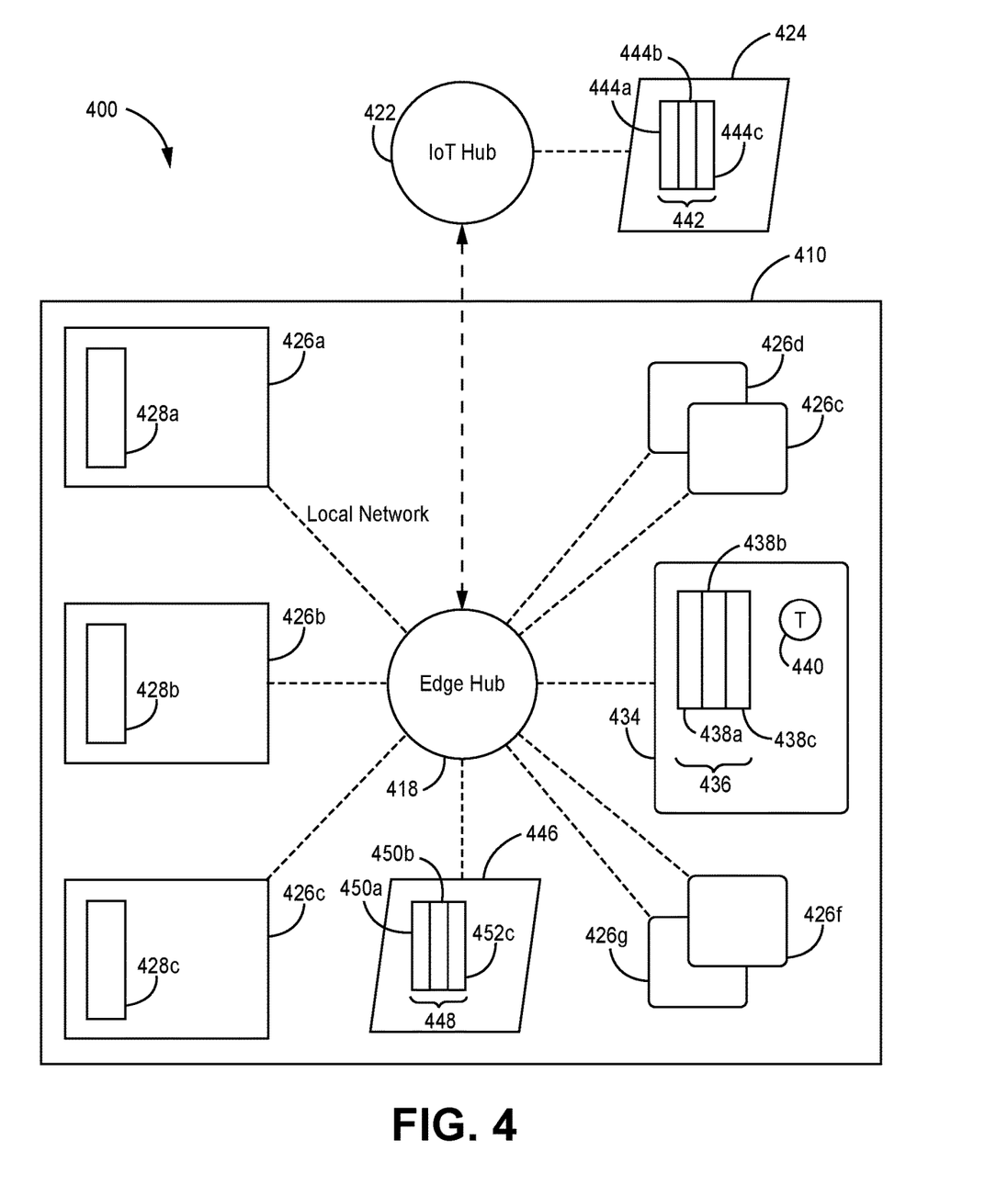
FIG. 4 is a block diagram illustrating an expansion of the local IoT network of FIG. 3, including an archive module.

As shown in FIG. 2, leaf modules 226a-c each operate based on a separate schedule 228a-c, respectively. Each leaf module 226a-c maintains its own schedule according to its module definition, persisted separately via IoT hub 222 in container registry 224 as separate objects. For the sake of simplicity, these objects will be referred to as persisted schedules 232a-c (corresponding to leaf modules 226a-c, respectively), but a person skilled in the art will recognize that these persisted schedules can be preserved as portions or aspects of more general persistence objects related to each leaf modules 226a-c. Although leaf modules are shown in FIGS. 2-4 as separate, some processing functions of these leaf modules need not be performed by separate hardware devices, or at different locations. More generally, leaf modules 226 of FIG. 2 and similar leaf modules of FIGS. 3 and 4 can be best understood as functional modules generally corresponding to particular hardware devices, rather than as modules that are necessarily fully instantiated in data storage and processing at specific separate hardware devices.

Each leaf module 226a-c maintains its own time loop 230a-c, respectively, to track the passage of time. Time loops 230a-c can most generally be any software element tracking the elapse of time. Each leaf module 226a-c independently flags the occurrence of events specified in its persisted schedule 226a-c based on the elapse of time according to its dedicated time loop 230a-c, respectively. Flagged event occurrences can include any action to be performed at a pre-specified (scheduled) time, such as regularly recurring transmissions, actuations, or other actions (e.g. transmitting a sensor state every minute), or actions triggered on a delay (e.g. transmit a module state once, 30 seconds after a device is actuated). These flagged events are wholly independently tracked within each respective leaf module 226a-c, although other events may be handled centrally, e.g. via edge hub 218. Persistence for each schedule 228a-c is handled via a corresponding separate persisted schedule 232a-c, which can be a part of a more broadly defined persistence object as noted above.

Edge system 210 disadvantageously requires each leaf module 226a-c to maintain its own time loop or loops 230a-c, which must remain active even while the respective leaf module 226a-c is otherwise dormant. The present specification, as described hereinafter, presents a centralized scheduling approach that simplifies timekeeping and reduces computational load by aggregating scheduling tasks at a scheduler module. These advantages are particularly pronounced in edge systems having a large number of distinct modules performing scheduled tasks according to separate schedules.

FIG. 3 is a block diagram illustrating a local IoT system 300 operable generally as described with respect to FIG. 2, but with schedules from leaf modules offloaded to a dedicated scheduler module 334. IoT system 300 includes multiple leaf modules 326a-g (collectively "leaf modules 326"), of which leaf modules 326a-c interface via edge hub 318 with scheduler module 334 to perform tasks at specific times. Leaf modules 326a-c are referred to hereinafter as requestor modules 326, with each requestor module 326 each having an associated requestor module schedule 328a-c (collectively "requestor module schedules 328") corresponding generally to schedules 228a-c of FIG. 2. Unlike leaf modules 326a-c of FIG. 2, however, requestor modules schedules 328 are not tracked independently by each requestor module 326. Instead, each requestor module 326 transmits a scheduler request via edge hub 318 to scheduler module 334. This scheduler request specifies any or all of the respective requestor module schedule 328 to be tracked by scheduler module 334, as well as payload messages corresponding to each scheduled task according to that schedule, as described in greater detail below with respect to FIG. 5. In the most simple case, the entirety of each requestor module schedule 328 can be provided to scheduler module 334, although some embodiments may reserve portions of requestor module schedules 328 conditionally, e.g. depending on configuration states of requestor modules 326. Although requestor module schedules 328 are illustrated in FIG. 3 as components of requestor modules 326, some embodiments of edge system 310 can situate requestor module schedules 328 elsewhere, such that the requestor module schedules 328 are retrieved by scheduler module 334 from other modules in response to scheduler requests that do not include the schedules themselves, e.g. from a separate repository within edge system 310, or from a cloud-based repository accessible via IoT hub 322.

Scheduler module 326 runs on a hardware device with data storage and processing circuitry. This can be IoT edge device 114 (see FIG. 1) or a separate hardware element in networked communication with IoT edge device 114. Scheduler module 326 includes subsystem schedule 336, an aggregated schedule including subsystem schedule parts 338a-c corresponding to respective requestor modules 326. These subsystem schedule parts 338a-c can be intermingled in a single schedule archive.

Individual schedules 228a-c in the conventional scheduling approach of edge system 210 collect event times correlated with event actions. For example, a single event entry in schedule 228a might specify an action (e.g. recording sensed pressure) to be undertaken by the leaf module 226 at a specific time (e.g. at 2:05:30). By contrast, subsystem schedule 336 can include scheduling data relevant to multiple leaf modules, and therefore includes event times and payload messages for each event, with each such event identifying the corresponding requestor module. Continuing the same example in the context of the centralized scheduling of edge system 310, a single event entry in subsystem schedule 336 for the same action includes the time (2:05:30), and a payload message for transmission from scheduler module 334 to requestor module 326a via edge hub 318. As described in further detail with regard to FIG. 5, the payload message is a triggered message responsive to the specific flagged time elapse event and transmitted through edge hub 318 to the appropriate requestor module. This payload message is actionable by its target requestor module. In some embodiments, subsystem schedule 336 can explicitly identify the specific requestor module associated with each schedule entry, e.g. for reporting or persistence. In other embodiments, the identification of the specific requestor module associated with each schedule entry can be contained solely within the payload message, to be parsed and transmitted to its appropriate destination by edge hub 318.

IoT system 300 can persist schedule 336 at a cloud location through IoT hub 322. As shown in FIG. 3, subsystem schedule 336 can be mirrored within container registry 324 as persisted subsystem schedule 342 having persisted subsystem schedule parts 344a-c corresponding to subsystem schedule parts 338a-c. In some embodiments, persisted subsystem schedule 342 can be a portion of a general module container image mirroring scheduler module 334 for cloud persistence on container registry 324. In other embodiments, persisted subsystem schedule 342 can alternatively or additionally be independently persisted within the cloud, i.e. accessible separately from other data associated with scheduler module 334.

Scheduler module 334 includes a persistent time loop 340 analogous to time loops 230a-c (described above with respect to FIG. 2). By concentrating clock-based functions from multiple requestor modules 326 into scheduler module 334, the centralized scheduling of edge system 310 eliminates redundant loads and permits requestor modules 326 to remain dormant between scheduled actions. In addition, persistence, reporting, and analysis of all scheduling information can be handled centrally through or by reference to scheduler module 334, which in some embodiments can simplify module initialization.

FIG. 4 is a block diagram illustrating an alternative embodiment to IoT system 400, which generally parallels IoT system 300 of FIG. 3 (with numbering incremented by 100 throughout), with the sole addition of local repository 446. Local repository 446 is a non-transient data storage element that provides a local persistence layer for scheduler module 434. Specifically, local repository 446 stores locally persisted subsystem schedule 448, which generally parallels or matches subsystem schedule 436 and persisted subsystem schedule 442, and which includes locally persisted subsystem schedule parts 450a-c corresponding to subsystem schedule parts 438a-c and persisted subsystem schedule parts 442a-c, respectively. Although local repository 446 is illustrated in FIG. 4 as a distinct module separate from edge hub 418, scheduler module 434, and other functional components of edge system 410, local repository 446 can in the most general case be any element capable of durably mirroring or otherwise providing persistence for subsystem schedule 436. Local repository 446 can, in example alternative embodiments, be a hardware functionality associated with other modules, such as edge hub 418 and/or scheduler module 434. By providing local persistence for scheduler module 434, local repository 446 can, in some embodiments, allow schedule 436 to be (re)initialized without reference to cloud components such as IoT hub 422 and container registry 424. Cloud persistence through IoT hub 422 can be provided in parallel with local persistence through local repository 446.

Figure 5:
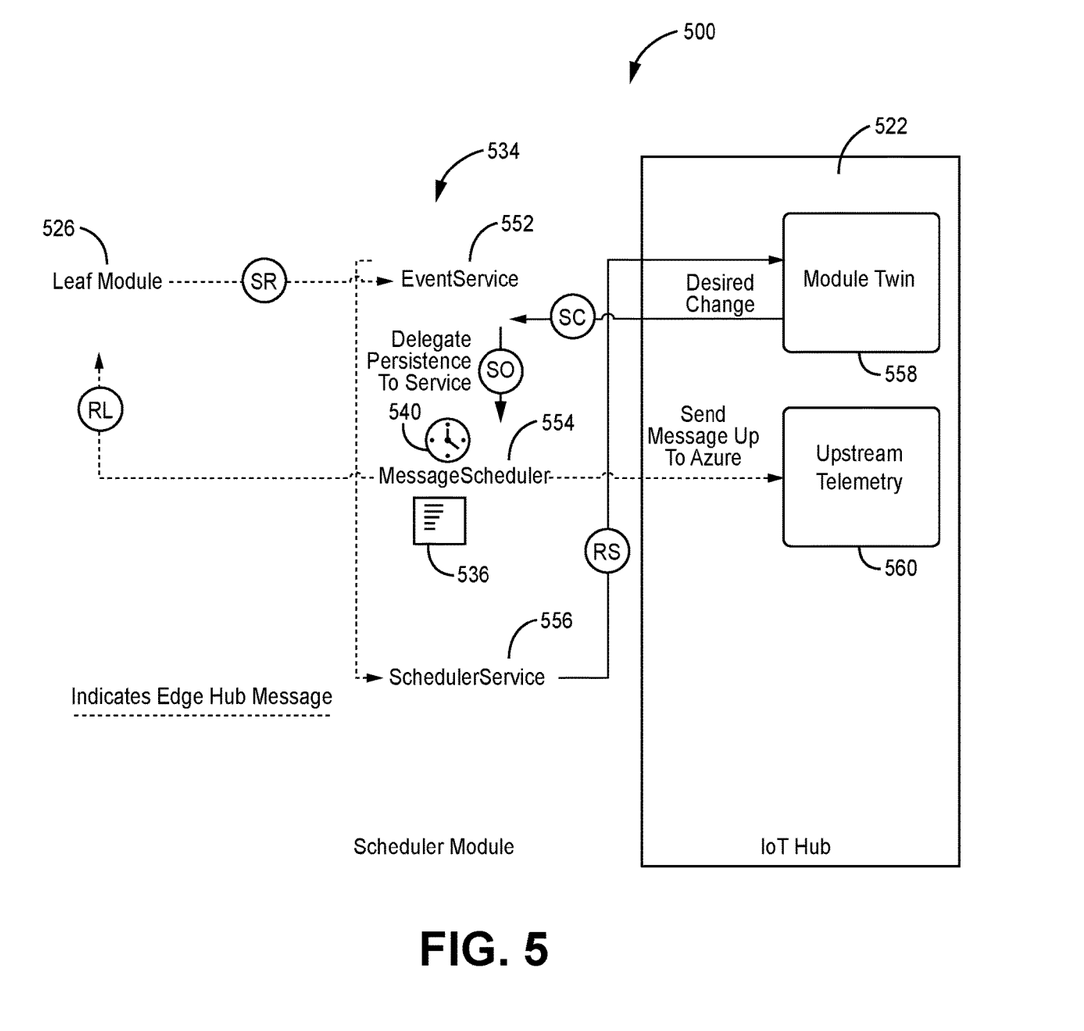
FIG. 5 is a block illustrating a subset of the local IoT network of FIG. 3 or 4 in greater detail concerning the dedicated scheduler module.

FIG. 5 is a simplified block diagram of IoT system 500, which operates generally as described above with respect to IoT systems 100, 300, and 400 in FIGS. 1, 3, and 4. Previously described components not shown in FIG. 5 (e.g. edge hub 118/318/418, edge agent 120, container registry 124/324/424) should be understood to be present but omitted from the illustration to simplify explanation. FIG. 5 depicts IoT hub 522, scheduler module 534, and leaf module 526. In the illustrated embodiment, scheduler module 534 includes three functional submodules: EventService 552, MessageService 554, and SchedulerService 556. IoT hub 522 provides access to ModuleTwin 558 and upstream telemetry 560. IoT hub 522 need not be the ultimate source for upstream telemetry 560 or ModuleTwin 558, but acts as a cloud gateway (via edge hub 118/318/418; not shown) to these elements. Upstream telemetry 560 is a catch-all category for any upstream data collection and analytics using schedule information from scheduler module 534, and need not be based in a single module or device, or directed to any single purpose. FIG. 5 also labels several specific communications discussed in detail hereinafter: scheduler request SR, state change SC, reported state RS, schedule update UD, and payload PL. Communications via edge hub 118/318/418 are indicated with a dashed line. Communications specified herein can, by way of example, use MQTT, HTTP, or AMQP protocols.

In an example embodiment, ModuleTwin 558 is a persisted, cloud-based, digital twin of scheduler module 534. ModuleTwin 558 can, for example, be a module image retrieved from a container registry (324/424). In the most general case, however, ModuleTwin 558 can broadly be a persistence object that mirrors at least some properties of scheduler module 534, including the contents of subsystem schedule 536. ModuleTwin 558 reflects a desired state of scheduler module 534, and EventService 552 receives state changes SC from ModuleTwin 558 necessary to conform scheduler module 534 to this desired state, as described in greater detail below.

EventService 552 is the functional component of scheduler 534 responsible for receiving and processing communications directed to scheduler module 534 from other modules or devices. EventService 552 listens for any type of communication directed to scheduler module 534, including scheduler requests SR from leaf modules 526 (via the edge hub), and state changes SC from ModuleTwin 558 (e.g. via the edge agent). In some embodiments, EventService 552 may also receive other communication packets related to centralized scheduling, e.g. requests for data related to upstream telemetry 560. In the illustrated embodiment, such events are not substantively processed by EventService 552, but rather by MessageScheduler 554.

Each scheduler request SR is a MQTT, HTTP, or AMQP message including several components. A scheduler request SR can, in a non-exhaustive listing, include all of the following for each schedule entry:

1. Schedule ID: an arbitrary identifier (e.g. a string) for the schedule entry, used as a reference by the requesting module when payload messages are received;
2. Repeat: a Boolean flag specifying whether the schedule entry is repeated;
3. Persist: a Boolean flag specifying whether the schedule entry should be persisted;
4. Run Time: a TimeSpan specifying the time at which the scheduled payload message should be sent, e.g. specifying an interval (every 5 seconds . . . ) and/or duration ( . . . for 5 minutes) for the schedule entry;
5. Payload: a payload PL to be transmitted in response to the time event, where the payload is intelligible and actionable to the requestor leaf module 526; and
6. Routing: information sufficient to direct the specified payload to its targets, e.g. mapping to an MQTT topic name that allows the IoT edge routing to be mapped to that topic.

These components of scheduler request SR, once received by EventService 552, are stored in subsystem schedule 536 by MessageScheduler 554. Each payload PL can, in a non-exhaustive listing, including all of the following:
1. Correlation ID: an arbitrary identifier (e.g. a string) for the payload, used for reference when published messages are received, e.g. by a leaf module 526;
2. Context: an arbitrary value serialized as a payload (e.g. a JSON or XML file) intelligible and actionable by the recipient module (e.g. the requesting leaf module 526);
3. Job Name: optionally, the name of a Job to be run by the recipient module when the payload is received.

EventService 552 passively listens for any change reported by ModuleTwin. Generally, a state change SC generated from ModuleTwin 558 can specify any new state to which scheduler module 534 should be updated. More specifically, state change SC may include adjustments and/or additions corresponding to any or all components of subsystem schedule 536, including components corresponding noted above with respect to the contents of scheduler request SR.

MessageScheduler 554 maintains subsystem schedule 536 and time loop 540 (as described above with respect to subsystem schedules 336/436 and time loops 340/440), and is the functional component of scheduler module 534 responsible for tracking the elapse of time against the schedule. MessageScheduler 554 revises or extends subsystem schedule 536 based on schedule updates SU from EventService 552. These updates can include schedule additions specified by scheduler requests SR received by EventService 552 from any leaf module 526, as well as state changes SC specifying a desired module state by comparison against ModuleTwin 558. Scheduler requests SR and persistence using ModuleTwin 558 are described in greater detail below. In some cases, external adjustments to subsystem schedule 536 (that is, to the schedules of any modules within the edge system making use of scheduler module 534) can be made by transmitting scheduler requests SR to EventService 552, which are then integrated into subsystem schedule 536 by MessageScheduler 554. External adjustments can, for example, include developer or operator adjustments, or changes requested by external modules within IoT system 500. Alternatively or additionally, external adjustments can be made by altering or replacing ModuleTwin 558.

Time loop 540 runs continuously while scheduler module 534 is active and subsystem schedule 536 contains schedule entries. As noted previously, subsystem schedule 536 specifies a scheduled event and a payload corresponding to that scheduled event. This scheduled event is mainly described herein as the occurrence of a specified clock time, but can more generally be any time-based event. When this scheduled event occurs, as determined by reference to time loop 540, MessageScheduler 554 transmits payload PL to leaf module 526. Payload PL is a triggered message corresponding to a scheduled task previously set e.g. by a scheduler request SR from the same leaf module 526. In other configurations, however, payload messages PL and/or the specific time can be adjusted or added by other modules directly, e.g. by cloud devices through EventService 552. MessageScheduler 554 can also transmit scheduled messages and/or respond to direct queries from cloud elements of IoT system 500 for upstream telemetry 560. Such messages can constitute transmissions of all or a portion of subsystem schedule 536, or can include analysis or subsystem schedule 536 performed by scheduler module 534.

SchedulerService 556 is the functional component of scheduler module 534 responsible for handling persistence of scheduler module 534 generally. In an example embodiment, all persistence for scheduler module 534 is accomplished via twinning of scheduler module 534 as a whole through SchedulerService 556. In some embodiments, however, portions of scheduler module 534 (e.g. for subsystem schedule 536) may additionally be persisted separately. SchedulerService 556 manages persistence of scheduler module 534 in local data storage (e.g. in memory of scheduler module, and in local repository 446—see FIG. 4) and, when requested, in the cloud. More specifically, SchedulerService 556 supplies reported state RS, which reflects a current state of scheduler module 534. State change SC (mentioned above) is generated through comparison of reported state RS against ModuleTwin 558. Discrepancies between reported state RS and ModuleTwin 558 are addressed through reconciliation via state change SC. Although this process is shown in FIG. 5 as involving IoT hub 522, persistence handled within IoT edge device 114 or local repository 446 is managed analogously by SchedulerService 556.

Figure 6:
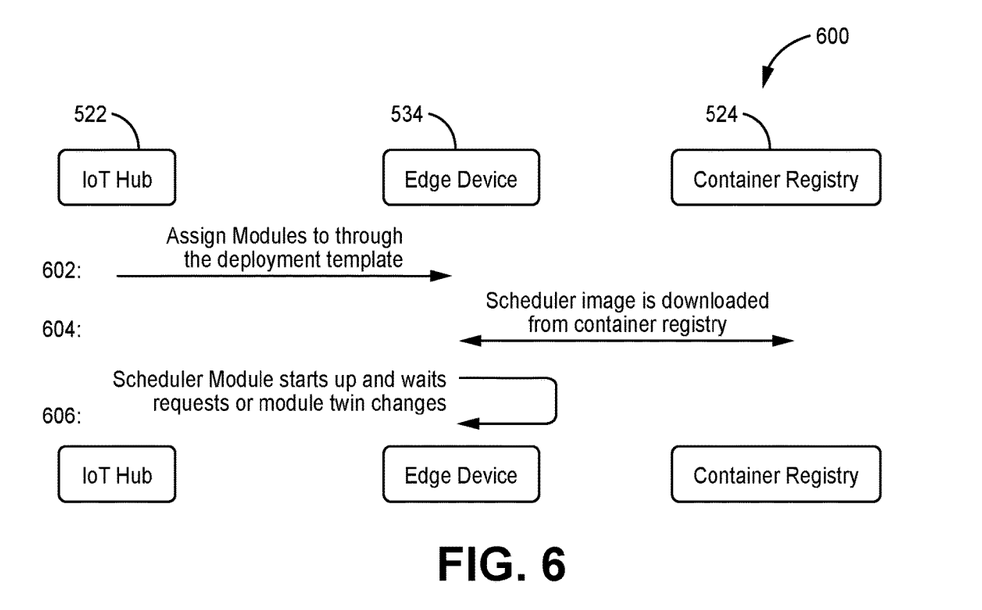
FIG. 6 is a method step diagram illustrating an onboarding process for the dedicated scheduler module of FIG. 5.
Figure 7:
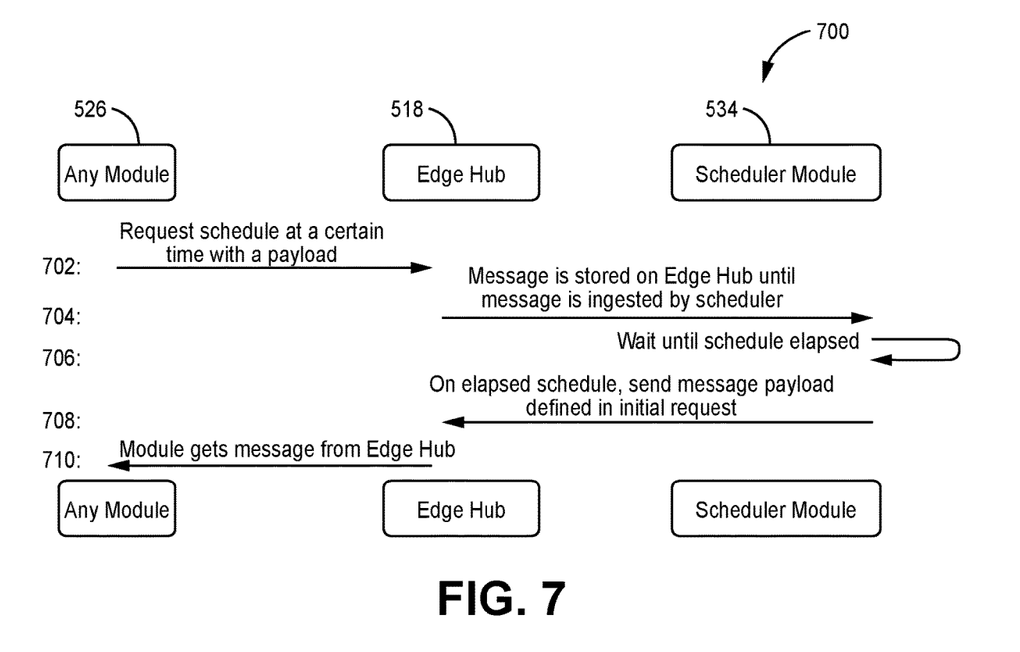
FIG. 7 is a method step diagram illustrating a scheduling process using the dedicated scheduler module of FIG. 5.
Figure 8:
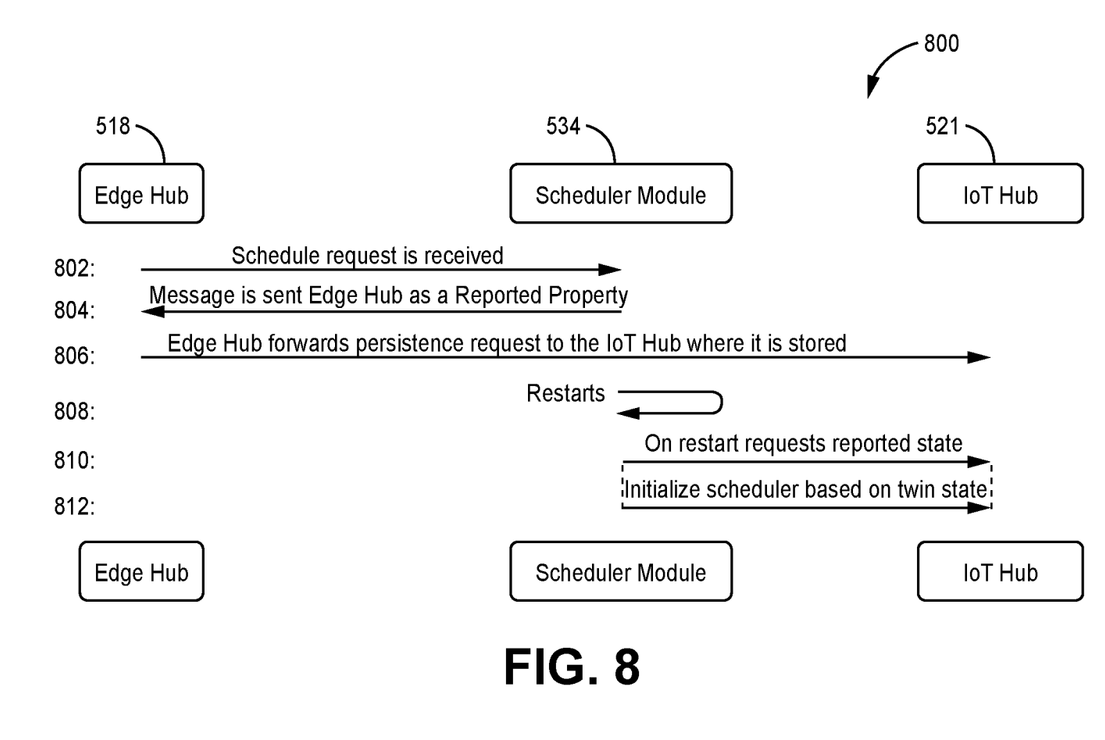
FIG. 8 is a method step diagram illustrating a cloud persistence process for the dedicated scheduler module of FIG. 5.

FIGS. 6-8 are method step diagrams illustrating specific processes involving scheduling module 534. FIG. 6 illustrates an onboarding process for scheduler module 534. FIG. 7 illustrates the processing of a scheduler request SR, through the transmission of corresponding payload PL. FIG. 8 illustrates cloud persistence of scheduler module 534 through a restart. FIGS. 6-8 schematically illustrate IoT hub 522 and scheduler module 534 as described above with respect to FIG. 5, as well as container registry 524 and edge hub 518 which operate substantially as described above with respect to container registry 324/424 and edge hub 318/418, respectively.

As shown in FIG. 6, onboarding begins when IoT hub 522 assigns modules via a deployment template. (Step 602). Although FIG. 6 focuses on the deployment of scheduling module 534, specifically, other modules can also be deployed to edge devices at this stage. For embodiments using Microsoft Azure IoT Edge or analogous architectures, for example, the edge hub (518) and edge agent (120/320/420) must be deployed before scheduler module 534 can function, as the edge hub and edge agent are required for communication and persistence, respectively, of scheduler module 534. Requestor modules can also be assigned at this stage. Once modules—including scheduler module 534— have been assigned, an image of each module is retrieved from container registry 524 to define the initial state of the module. (Step 604). Container registry can provide an image for a new scheduler module 534 with no scheduling information yet tracked. In some embodiments, however, the scheduler image retrieved from container registry 524 can include previously provided schedule entries. With its initial state defined, scheduler module 534 starts up and awaits schedule requests SR or state change messages SC reflecting module twin changes, as described above with respect to FIG. 5. (Step 606). Scheduler requests SR can be received from any local module within the edge system, and module twin changes in any governing persistence layer can necessitate state changes SC.

As shown in FIG. 7, any module (shown here as leaf module 526) can request schedule handling by transmitting a scheduler request SR to edge hub 518. (Step 702). As noted with respect to FIG. 3, individual leaf modules can be instantiated with their own schedules (see schedules 328a-c for requestor modules 326a-c, respectively), which make up some or all of the contents of their corresponding scheduling request SR. Edge hub 518 routes scheduler request SR to scheduler module 534, and stores scheduler request SR within edge hub 518 until the request is ingested by Event-Service 552 of scheduler module 518. (Step 704).

When EventService 552 ingests scheduler request SR, MessageScheduler 554 records the contents of the request in subsystem schedule 534, and waits for a scheduled time event to occur, by reference to time loop 540. (Step 706). When the event occurs—that is, when the schedule elapses—MessageScheduler 554 transmits the payload PL specified in the scheduler request SR to edge hub 518. (Step 708). Edge hub 518 routes this payload PL to the appropriate module or modules 526 specified in by routing from the scheduler request SR, accompanying or included within payload PL. (Step 710). Any modules ingesting a payload PL process the Context included therein, i.e. performing the scheduled task as instructed by the payload PL.

As shown in FIG. 8, persistence for scheduler module 534 is updated whenever a new scheduler request SR is received. (Step 802). In response to a schedule request SR, SchedulerService 556 transmits a persistence request to edge hub 518. (Step 804). Preferably, every schedule request SR with a non-zero Boolean Persist can trigger SchedulerService 556 to transmit such a persistence request. In some embodiments, however, SchedulerService 556 may transmit a persistence request only when sufficient changes have accumulated, and/or periodically according to time loop 540. This persistence request can, for example, take the form of a Reported Property (identifying the contents of the schedule request SR) coupled with an identification of the desired ModuleTwin 558. Edge hub 518 forwards this persistence request to IoT hub 522, where it is stored and/or forwarded to update ModuleTwin 558. (Step 806). Whenever scheduler module 534 restarts (Step 808), the scheduler module requests a state change SC from IoT hub 522 via edge agent 520 (as described with respect to 320/420) (Step 810), and reinitializes based on this state changes SC, as received through EventService 552.

Method 800 illustrates cloud persistence of scheduler module 534. Local persistence, e.g. via local repository 446, can be added as a supplement to cloud persistence, and managed analogously through SchedulerService 556 and edge hub 518, without reference to IoT hub 522.

Methods 600, 700, and 800 present exemplary methods for initializing and operating scheduler module 534. Scheduler module 534 collects individual device or module schedules from distributed components within the edge system, and centralizes tracking of those schedules at MessageScheduler 554. Scheduler module 534 is persisted through module twinning using ModuleTwin 558, via IoT hub 522, but is capable of sustained operation independent of the cloud, as needed. By concentrating requestor module schedules in a single location, the introduction of scheduler module 534 into the edge system removes duplicative background time loops and simplifies schedule reporting for upstream telemetry.

Discussion of Possible Embodiments

The following are non-exclusive descriptions of possible embodiments of the present invention.

An Internet of Things (IoT) system comprising: an IoT hub and a local IoT subsystem comprising a plurality of subsystem devices, the plurality of subsystem devices comprising: an edge hub communicatively coupled to the IoT hub and to each of the other subsystem devices; at least one requestor module configured to perform a task according to a requestor module schedule; and a scheduler module comprising a persistent time loop and configured to: receive a scheduler request from the at least one requestor module via the edge hub; generate a subsystem schedule including the requestor module schedule, based on the scheduler request; transmit at least a part of the subsystem schedule to a persistence layer outside of the local IoT subsystem, via the IoT hub; flag a scheduled event occurrence based on elapse of time according to the time loop, in reference to the subsystem schedule; and transmit a triggered message to the at least one requestor module in response to the flagging of the scheduled event occurrence, the triggered message corresponding to the task. The IoT system of the preceding paragraph can optionally include, additionally and/or alternatively, any one or more of the following features, configurations and/or additional components:

The IoT system of the preceding paragraph can optionally include, additionally and/or alternatively, any one or more of the following features, configurations and/or additional components:

A further embodiment of the foregoing IoT system, wherein the scheduler module comprises: an EventService submodule configured to listen for the scheduler request from the requestor module; a MessageScheduler submodule including the persistent time loop and configured to: update the subsystem schedule based on a scheduler request received by the EventService submodule; flag the scheduled event occurrence based on the elapse of time specified by the subsystem schedule, as identified by running of the persistent time loop; and transmit the triggered message to the at least one requestor module, based on the flagging of the scheduled event occurrence; and a SchedulerService submodule configured to update persisted properties of the scheduler module based on the scheduler request received by the EventService submodule.

A further embodiment of the foregoing IoT system, wherein the persisted properties include the at least a part of the subsystem schedule.

A further embodiment of the foregoing IoT system, wherein the EventService submodule is additionally configured to listen for the scheduler request from a persistence layer via the IoT hub.

A further embodiment of the foregoing IoT system, wherein the at least one requestor module comprises a plurality of requestor modules, each of the plurality of requestor modules being configured to perform a separate task according to separate requestor module schedule, wherein the subsystem schedule includes the separate requestor module schedules.

A further embodiment of the foregoing IoT system, wherein the scheduler request comprises: an identification of the at least one requestor module; the requestor module schedule; and an identification of content to be included in the triggered message.

A further embodiment of the foregoing IoT system, wherein the scheduler request further comprises at least one of: a runtime duration specifying how long a schedule entry corresponding to the requestor module schedule is to be maintained within the subsystem schedule; a Boolean persist flag specifying whether the schedule entry should be persisted via the persistence layer; and a Boolean repeat flag specifying whether the schedule entry is repeated within the subsystem schedule.

A further embodiment of the foregoing IoT system, wherein the triggered message comprises: an identification of the task to be performed by the at least one requestor module; and a payload related to the task and directly actionable by the at least one requestor module.

A further embodiment of the foregoing IoT system, wherein the requestor module is configured to perform the task in response to receipt of the triggered message via the edge hub.

A further embodiment of the foregoing IoT system, wherein the requestor module does not include a persistent time loop.

A further embodiment of the foregoing IoT system, wherein the triggered message is an MQTT message, and wherein the scheduler request further comprises a name enabling mapping content of the triggered message to an MQTT topic.

A further embodiment of the foregoing IoT system, wherein: the persistence layer comprises a virtual twin of at least a part of the scheduler module, the EventService submodule is configured to override the subsystem schedule after restart of the scheduler module, based on the virtual twin, and the SchedulerService submodule provides updates to a reported state of the scheduler module to the virtual twin, the reported state including at least a subset of the subsystem schedule.

A further embodiment of the foregoing IoT system, further comprising transmitting at least the part of the subsystem schedule to a local persistence module within the local IoT subsystem.

A further embodiment of the foregoing IoT system, wherein at least one of the local persistence module and the persistence layer outside of the IoT subsystem comprises a database.

A scheduler module for an Internet of Things (IoT) edge system, the scheduler module comprising: an EventService submodule configured to listen for scheduler requests from leaf modules within the IoT edge system; a SchedulerService submodule configured to transmit updates regarding a state of the scheduler module to a persistence layer outside of the IoT edge system; and a MessageScheduler submodule configured to: run a persistent time loop; update a master schedule based on scheduler requests received via the EventService submodule; identify scheduled events as they occur, based on the master schedule and a state of the persistent time loop; and transmit triggered messages to the leaf modules based on the identification of scheduled event occurrences.

The scheduler module of the preceding paragraph can optionally include, additionally and/or alternatively, any one or more of the following features, configurations and/or additional components:

A further embodiment of the foregoing scheduler module, wherein the scheduler module is configured to communicate with the leaf modules via an edge hub.

A further embodiment of the foregoing scheduler module, wherein each scheduler request comprises: an identification of one of the leaf modules to receive corresponding triggered messages; an event to be registered in the master schedule; and an identification of content to be included in the triggered message.

A further embodiment of the foregoing scheduler module, wherein the EventService submodule is additionally configured to listen for initialization instructions from the persistence layer.

A further embodiment of the foregoing scheduler module, wherein the SchedulerService submodule is configured to communicate with the persistence layer via an IoT hub external to the IoT edge system.

A method of managing scheduling across distributed Internet of Things (IoT) devices within an IoT network comprising an IoT hub, an edge hub in communication with the IoT hub, and a plurality of leaf modules in communication with the edge hub, the plurality of leaf modules comprising a scheduling module and a plurality of requestor modules, the method comprising: transmitting a scheduler request from the each of the requestor modules to the scheduler module, via the edge hub; updating a master schedule housed on the scheduler module, based on the scheduler requests from all of the requestor modules; running a persistent time loop on the scheduler module; flagging scheduled event occurrences as they occur, based on the master schedule and a state of the persistent time loop; transmitting triggered messages to specific requestor modules in response to flagged, scheduled event occurrences corresponding to each respective requestor module; and transmitting persistence data to the IoT hub, the persistence data including at least a portion of the master schedule.

The method of the preceding paragraph can optionally include, additionally and/or alternatively, any one or more of the following features, configurations and/or additional components:

A further embodiment of the foregoing method, further comprising: restarting the scheduler module at a time subsequent to transmitting the persistence data to the IoT hub; receiving reinitialization data including the persistence data from the IoT hub, after restarting the scheduler module; and reinitializing the scheduler module with the master schedule, based on the reinitialization data.

A further embodiment of the foregoing method, wherein the scheduler request and the triggered message are MQTT, HTTP, or AMQP messages.

A further embodiment of the foregoing method, wherein the steps of transmitting the scheduler request, updating the master schedule, running the persistent time loop, flagging the scheduled event occurrences, and transmitting the triggered messages all occur locally within an edge network including the edge hub, without reliance on the IoT hub.

A further embodiment of the foregoing method, further comprising transmitting persistence data to a local persistence layer within the edge network.

A further embodiment of the foregoing method, further comprising constructing a digital twin external to the edge network, based on the persistence data.

A further embodiment of the foregoing method, further comprising reinitializing the scheduler module based on the digital twin Summation Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of managing scheduling across distributed Internet of Things (IoT) devices within an IoT network comprising an IoT hub, an edge hub in communication with the IoT hub, and a plurality of leaf modules in communication with the edge hub, the plurality of leaf modules comprising a scheduling module and a plurality of requestor modules, the method comprising:
   transmitting a scheduler request from the each of the requestor modules to a scheduler module, via the edge hub;
   updating a master schedule housed on the scheduler module, based on the scheduler requests from all of the requestor modules;
   running a persistent time loop on the scheduler module;
   flagging scheduled event occurrences as they occur, based on the master schedule and a state of the persistent time loop;
   transmitting triggered messages to specific requestor modules in response to flagged, scheduled event occurrences corresponding to each respective requestor module; and
   transmitting persistence data to the IoT hub, the persistence data including at least a portion of the master schedule.

2. The method of claim 1, further comprising:
   restarting the scheduler module at a time subsequent to transmitting the persistence data to the IoT hub;
   receiving reinitialization data including the persistence data from the IoT hub, after restarting the scheduler module; and
   reinitializing the scheduler module with the master schedule, based on the reinitialization data.

3. The method of claim 2, wherein the scheduler module comprises an EventService module configured to listen for the reinitialization data from the IoT hub.

4. The method of claim 1, wherein the scheduler request and the triggered message are HTTP or AMQP messages.

5. The method of claim 4, wherein the triggered message is an MQTT message, and wherein the scheduler request further comprises a name enabling mapping context of the triggered message to an MQTT topic.

6. The method of claim 1, wherein the steps of transmitting the scheduler request, updating the master schedule, running the persistent time loop, flagging the scheduled event occurrences, and transmitting the triggered messages all occur locally within an edge network including the edge hub, without reliance on the IoT hub.

7. The method of claim 6, further comprising transmitting persistence data to a local persistence layer within the edge network.

8. The method of claim 7, further comprising constructing a digital twin external to the edge network, based on the persistence data.

9. The method of claim 8, further comprising reinitializing the scheduler module based on the digital twin.

10. The method of claim 1, further comprising, prior to transmitting the scheduler request: assigning a Boolean flag to each schedule entry as a part of the scheduler request.

11. The method of claim 10, wherein the Boolean flag is a Boolean repeat flag specifying that the schedule entry is repeated within the scheduler module.

12. The method of claim 10, wherein the Boolean flag is a Boolean persist flag specifying that the schedule entry should be persisted via the persistence layer.

13. The method of claim 1, further comprising, prior to transmitting scheduler requests from each of the requestor modules: assigning a runtime duration to at least a subset of the schedule entries as a part of scheduler request, the runtime duration specifying a maintenance duration of a schedule entry.

14. The method of claim 1, wherein the scheduler request transmitted from the each of the requestor modules comprises an identification of one of the leaf modules to receive corresponding triggered messages.

15. The method of claim 1, wherein the scheduler request transmitted from the each of the requestor modules comprises an event to be registered in the master schedule.

16. The method of claim 1, wherein the scheduler request transmitted from the each of the requestor modules comprises an identification of content to be included in the triggered message.

17. The method of claim 16, further comprising, wherein transmitting the triggered message comprises transmitting a message payload comprising the identification of context.

18. The method of claim 16, wherein the message payload further comprises a Job Name specifying a job to be run by the respective recipient requestor module.

19. The method of claim 1, wherein the requestor modules do not include persistent time loops.

* * * * *